United States Patent
Gladding et al.

(10) Patent No.: US 12,118,057 B2
(45) Date of Patent: Oct. 15, 2024

(54) COMPUTING PARTIAL MATRICES AT HARDWARE ACCELERATOR

(71) Applicant: Microsoft Technology Licensing, LLC, Redmond, WA (US)

(72) Inventors: Derek Edward Davout Gladding, Poughquag, NY (US); Nitin Naresh Garegrat, San Jose, CA (US); Timothy Hume Heil, Woodinville, WA (US); Balamurugan Kulanthivelu Veluchamy, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 758 days.

(21) Appl. No.: 17/149,619

(22) Filed: Jan. 14, 2021

(65) Prior Publication Data
US 2022/0261456 A1 Aug. 18, 2022

(51) Int. Cl.
*G06F 17/16* (2006.01)

(52) U.S. Cl.
CPC .................................. *G06F 17/16* (2013.01)

(58) Field of Classification Search
CPC ......... G06F 17/16; G06F 17/153; G06N 3/04; G06N 3/0464; G06N 3/063
See application file for complete search history.

(56) References Cited

U.S. PATENT DOCUMENTS

| 7,509,366 | B2 | 3/2009 | Hansen |  |
|---|---|---|---|---|
| 8,275,822 | B2 | 9/2012 | Olofsson et al. |  |
| 9,112,743 | B1 * | 8/2015 | Shirakawa | H04B 1/123 |
| 10,642,614 | B2 | 5/2020 | Kaul et al. |  |
| 10,901,715 | B1 * | 1/2021 | Raiman | G06F 9/4552 |
| 11,341,400 | B1 * | 5/2022 | Ratnayake | G06N 3/048 |
| 2013/0232495 | A1 * | 9/2013 | Rossbach | G06F 9/5044 718/102 |

(Continued)

OTHER PUBLICATIONS https://math.stackexchange.com/questions/1379234/can-you-add-a-scalar-to-a-matrix, Hans Lundmark et al., Aug. 2015 (Year: 2015).*

(Continued)

*Primary Examiner* — Emily E Larocque
(74) *Attorney, Agent, or Firm* — Alleman Hall & Tuttle LLP

(57) ABSTRACT

A computing device, including a hardware accelerator configured to receive a first matrix and receive a second matrix. The hardware accelerator may, for a plurality of partial matrix regions, in a first iteration, read a first submatrix of the first matrix and a second submatrix of the second matrix into a front-end processing area. The hardware accelerator may multiply the first submatrix by the second submatrix to compute a first intermediate partial matrix. In each of one or more subsequent iterations, the hardware accelerator may read an additional submatrix into the front end processing area. The hardware accelerator may compute an additional intermediate partial matrix as a product of the additional submatrix and a submatrix reused from an immediately prior iteration. The hardware accelerator may compute each partial matrix as a sum of two or more of the intermediate partial matrices and may output the plurality of partial matrices.

20 Claims, 11 Drawing Sheets

(56) References Cited

U.S. PATENT DOCUMENTS

| | | | | |
|---|---|---|---|---|
| 2014/0122551 | A1* | 5/2014 | Dogon | G06F 17/16 |
| | | | | 708/200 |
| 2015/0006597 | A1* | 1/2015 | Troyer | G06N 10/00 |
| | | | | 708/200 |
| 2016/0162402 | A1 | 6/2016 | Woolley et al. | |
| 2019/0205740 | A1 | 7/2019 | Judd et al. | |
| 2019/0266218 | A1* | 8/2019 | Scott | G06F 13/28 |
| 2020/0142949 | A1* | 5/2020 | Liao | G06F 17/16 |
| 2021/0089304 | A1* | 3/2021 | He | G06F 7/483 |
| 2023/0229730 | A1* | 7/2023 | Mansell | G06F 5/01 |
| | | | | 708/209 |

OTHER PUBLICATIONS

Srivastava, Nitish et al. MatRaptor: A Sparse-Sparse Matrix Multiplication Accelerator Based on Row-Wise Product, School of ECE, Cornell University, Nov. 2020, pp. 3-4 [online], [retrieved on Feb. 23, 2023]. Retrieved from the Internet: www.csl.cornell.edu/~zhiruz/pdfs/matraptor-micro2020.pdf (Year: 2020).*

Resolving Low-Level Graphics Issues, Choose a Renderer Implementation for Your System. Help Center Manual [online]. Mathworks corporation, 2014 [retrieved on Feb. 23, 2023], Retrieved from the Internet: www.mathworks.com/help/matlab/creating_plots/resolving-low-level-graphics-issues.html (Year: 2014).*

Roberson, Walter. 'Re: data set from a matrix'. In Matlab Answers [online]. Portola Valley (CA): Mathworks, Aug. 3, 2015 [retrieved on Feb. 23, 2023]. Retrieved from the Internet: www.mathworks.com/matlabcentral/answers/232222-how-to-set-an-upper-and-lower-limit-on-a-data-set-from-a-matrix (Year: 2015).*

Albericio, et al., "Cnvlutin: Ineffectual-Neuron-Free Deep Neural Network Computing", In Proceedings of the 43rd International Symposium on Computer Architecture, Jun. 18, 2016, pp. 1-13.

Belyaev, et al., "A High-perfomance Multi-format SIMD Multiplier for Digital Signal Processors", In Proceedings of IEEE Conference of Russian Young Researchers in Electrical and Electronic Engineering (ElConRus), Jan. 27, 2020, pp. 1780-1783.

Chen, et al., "Eyeriss v2: A Flexible Accelerator for Emerging Deep Neural Networks on Mobile Devices", In Journal on Emerging and Selected Topics in Circuits and Systems, vol. 9, Issue 2, Jun. 1, 2019, pp. 292-308.

"International Search Report and Written Opinion Issued in PCT Application No. PCT/US21/061303", Mailed Date: Mar. 24, 2022, 14 Pages.

Wu, et al., "Core Placement Optimization for Multi-chip Many-core Neural Network Systems with Reinforcement Learning", In Journal of ACM Transactions on Design Automation of Electronic Systems, vol. 26, Issue 2, Article 11, Oct. 19, 2020, 27 Pages.

* cited by examiner

218 — AT THE BACK-END PROCESSING AREA, ADDING A SCALAR TO EACH PARTIAL MATRIX ELEMENT INCLUDED IN THE PLURALITY OF PARTIAL MATRICES

220 — AT THE BACK-END PROCESSING AREA, SETTING AT LEAST ONE PARTIAL MATRIX ELEMENT TO A LOWER-BOUND VALUE WHEN THE AT LEAST ONE PARTIAL MATRIX ELEMENT IS BELOW A FIRST THRESHOLD VALUE

222 — AT THE BACK-END PROCESSING AREA, SETTING THE AT LEAST ONE PARTIAL MATRIX ELEMENT TO AN UPPER-BOUND VALUE WHEN THE AT LEAST ONE PARTIAL MATRIX ELEMENT IS ABOVE A SECOND THRESHOLD VALUE

224 — ROUNDING ONE OR MORE PARTIAL MATRIX ELEMENTS INCLUDED IN THE PLURALITY OF PARTIAL MATRICES

FIG. 8

COMPUTING PARTIAL MATRICES AT HARDWARE ACCELERATOR

BACKGROUND

When performing training and inferencing machine learning models, matrix multiplication operations are commonly performed. These matrix multiplication operations may be performed for large matrices (e.g. with tens of thousands or hundreds of thousands of rows or columns). Matrix multiplication is frequently the most compute-intensive step of training a machine learning model.

SUMMARY

According to one aspect of the present disclosure, a computing device is provided, including a hardware accelerator configured to receive a first matrix at a first input buffer and receive a second matrix at a second input buffer. The hardware accelerator may be further configured to, for a plurality of partial matrix regions each including a plurality of partial matrices, in a first iteration of a plurality of iterations, read a first submatrix of the first matrix and a second submatrix of the second matrix into a front-end processing area. The hardware accelerator may be further configured to, at the front-end processing area, multiply the first submatrix by the second submatrix to compute a first intermediate partial matrix of a plurality of intermediate partial matrices. In each of one or more subsequent iterations of the plurality of iterations, the hardware accelerator may be further configured to read an additional submatrix into the front end processing area. At the front-end processing area, the hardware accelerator may be further configured to compute an additional intermediate partial matrix of the plurality of intermediate partial matrices as a product of the additional submatrix and a submatrix reused from an immediately prior iteration of the plurality of iterations. At a back-end processing area, the hardware accelerator may be further configured to compute each partial matrix of the plurality of partial matrices as a sum of two or more of the intermediate partial matrices that correspond to a shared position within the partial matrix region. The hardware accelerator may be further configured to output the plurality of partial matrices to a result buffer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 shows additional steps of the method of FIG. 7 that may be performed at the hardware accelerator in some examples.

DETAILED DESCRIPTION

Figure 1:
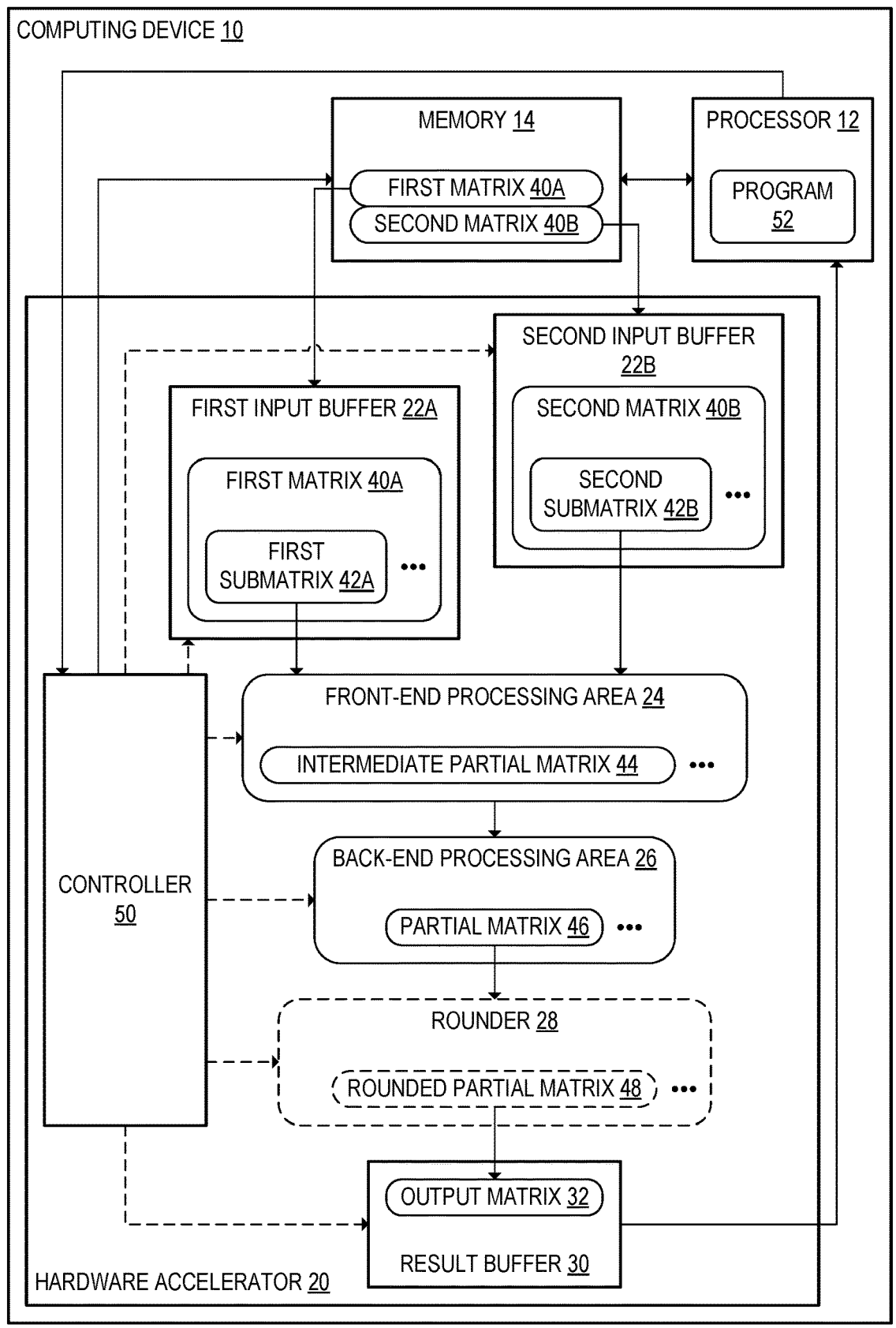
FIG. 1 schematically shows a computing device including a hardware accelerator, according to one example embodiment.

In order to increase the speed and efficiency with which matrix multiplication operations may be performed, a computing device 10 including a hardware accelerator 20 is provided, as schematically shown in the example embodiment of FIG. 1. The hardware accelerator 20 is a specialized processing device configured to perform matrix multiplication more quickly than it would typically be performed on a general-purpose processor. In addition to the hardware accelerator 20, the computing device 10 may further include a processor 12, which may be a general-purpose processor that is communicatively coupled to the hardware accelerator 20. The computing device 10 may further include memory 14, which may be communicatively coupled to the processor 12 and the hardware accelerator 20. The memory 14 may include volatile memory and/or non-volatile memory.

In the example of FIG. 1, the components of the computing device 10 are provided in a single physical computing device. However, in some examples, one or more components of the computing device 10 may be instantiated at least in part at one or more other physical computing devices such that the functionality of the computing device 10 is distributed between a plurality of physical computing devices. For example, the computing device 10 may be instantiated at a data center in which a plurality of physical computing devices are communicatively connected via a data fabric. In examples in which the computing device 10 is located in a data center, the computing device 10 may be configured to communicate with one or more client computing devices over a network.

The hardware accelerator 20 may include a first input buffer 22A, a second input buffer 22B, and a result buffer 30. In some examples, the first input buffer 22A, the second input buffer 22B, and the result buffer 30 may be static random access memory (SRAM) buffers. Alternatively, the first input buffer 22A, the second input buffer 22B, or the result buffer 30 may be some other type of memory device. The first input buffer 22A and the second input buffer 22B may be configured to store data that is received for processing at the hardware accelerator 20 from another component of the computing device 10. The result buffer 30 may be configured to store results of computations performed at the hardware accelerator 20 for output to one or more other components of the computing device 10. In some examples, data may be transferred to and/or from the hardware accelerator 20 via direct memory access.

The hardware accelerator 20 may further include a front-end processing area 24 and a back-end processing area 26. As discussed in further detail below, the hardware accelerator 20 may be configured to perform a plurality of dot products at the front-end processing area 24. The hardware accelerator 20 may be further configured to sum a plurality of intermediate results at the back-end processing area 26. In some examples, the hardware accelerator 20 may further include a rounder 28 configured to round one or more results computed at the back-end processing area 26 before the one or more results are transmitted to the result buffer 30.

The hardware accelerator 20 may further include a controller 50 configured to transmit control signals to one or more of the memory 14, the first input buffer 22A, the second input buffer 22B, the front-end processing area 24, the back-end processing area 26, the rounder 28, and the result buffer 30. In the example of FIG. 1, the controller 50 is shown as an on-chip hardware component included in the hardware accelerator 20. However, in other examples, the controller 50 may be a software module executed at the processor 12 of the computing device 10. As shown in FIG. 1, the controller 50 may be configured to receive a request to perform a matrix multiplication operation from the processor 12. The request to perform the matrix multiplication operation may be made a program 52 executed at the processor 12, which may be further configured to receive a result of the matrix multiplication operation from the result buffer 30.

The hardware accelerator 20 may be configured to receive a first matrix 40A at the first input buffer 22A and receive a second matrix 40B at the second input buffer 22B. In addition, when the first matrix 40A is multiplied by the second matrix 40B, an output matrix 32 resulting from the matrix multiplication operation may be stored in a result buffer 30 of the hardware accelerator 20. The output matrix 32 may include a plurality of partial matrices 46, as discussed in further detail below.

Figure 2:
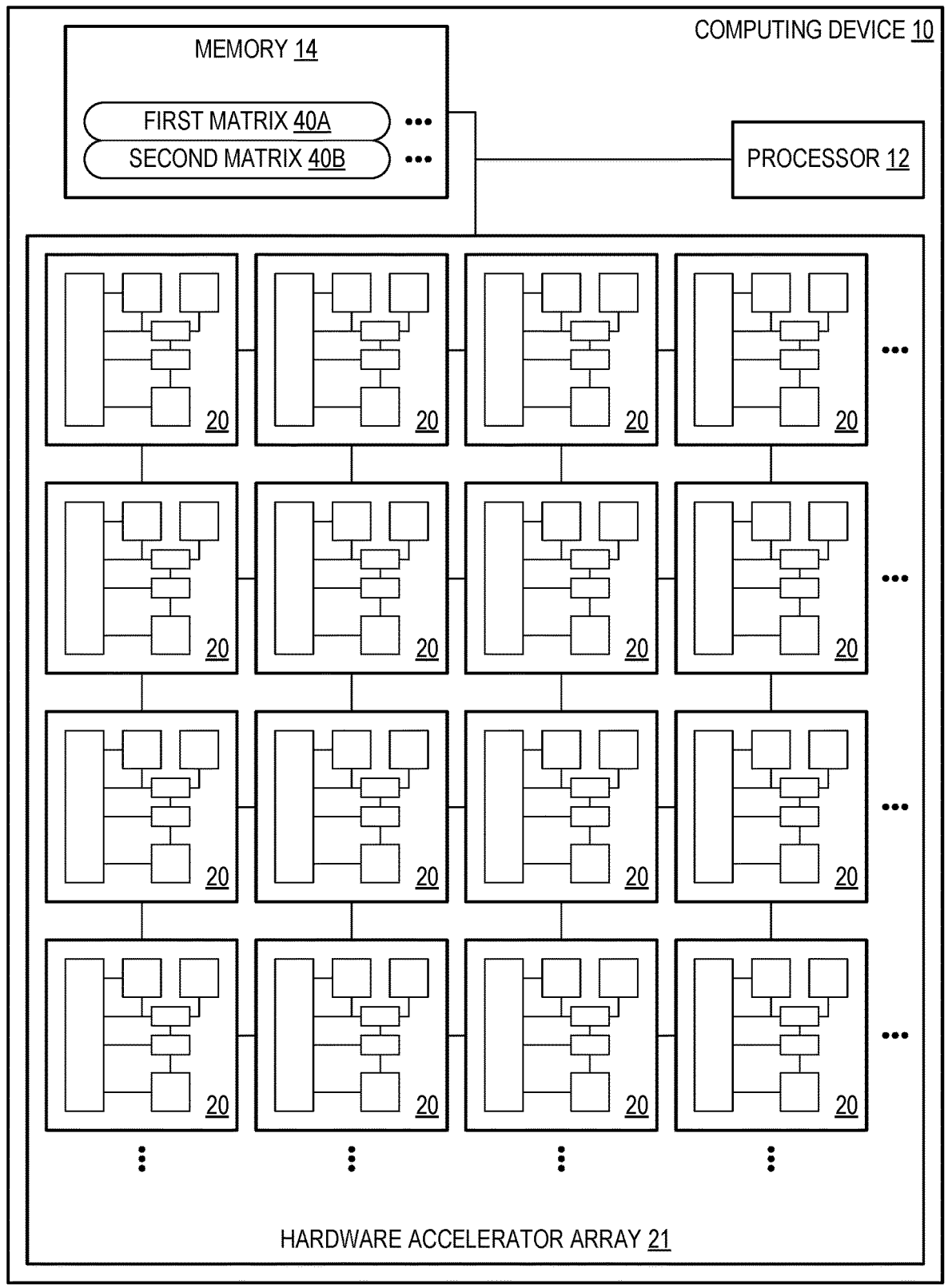
FIG. 2 schematically shows the example computing device of FIG. 1 when the hardware accelerator is included in a hardware accelerator array.

The first matrix 40A and the second matrix 40B may be segments of larger matrices that are respectively read into the first input buffer 22A and the second input buffer 22B rather than the entire larger matrices. Thus, a multiplication operation between large matrices (e.g. with tens of thousands or hundreds of thousands of rows or columns) may be divided into a plurality of matrix multiplication operations. These matrix multiplication operations may be parallelized, which may increase computation speed. In some examples, as shown in FIG. 2, the computing device 10 may include a plurality of hardware accelerators 20 arranged in a hardware accelerator array 21. At the hardware accelerators 20 included in the hardware accelerator array 21, a plurality of first matrices 40A and a plurality of second matrices 40B in which the first matrix 40A and the second matrix 40B are respectively included may be multiplied in parallel. The plurality of hardware accelerators 20 included in the hardware accelerator array 21 may each be coupled to the processor 12 and/or the memory 14, as shown in the example of FIG. 2.

Figure 3:
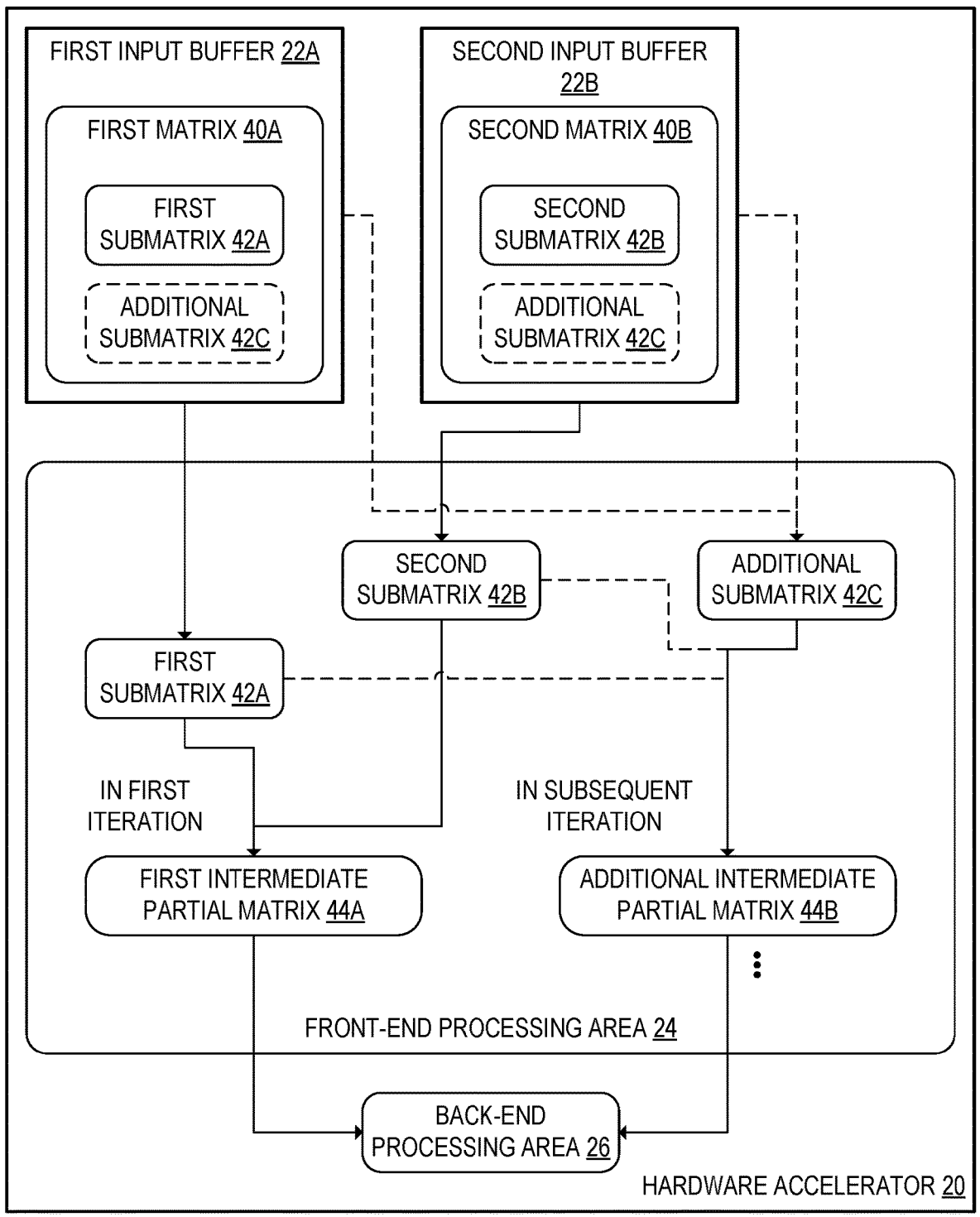
FIG. 3 schematically shows a front-end processing area of the hardware accelerator when a plurality of intermediate partial matrices are computed, according to the example of FIG. 1.

Returning to FIG. 1, at the front-end processing area 24, the hardware accelerator 20 may be further configured to compute a plurality of intermediate partial matrices 44 over a corresponding plurality of iterations. As depicted in the example of FIG. 3, the plurality of intermediate partial matrices 44 may include a first intermediate partial matrix 44A and one or more additional intermediate partial matrices 44B. FIG. 3 shows the front-end processing area 24 of the hardware accelerator 20 in additional detail when the first intermediate partial matrix 44A and the one or more additional intermediate partial matrices 44B are computed. As shown in FIG. 3, the hardware accelerator 20 may be further configured to read, into the front-end processing area 24, a first submatrix 42A of the first matrix 40A and a second submatrix 42B of the second matrix 40B. The first submatrix 42A and the second submatrix 42B each include a plurality of matrix elements, with the first submatrix 42A including a plurality of first matrix elements of the first matrix 40A and the second submatrix 42B including a plurality of second matrix elements of the second matrix 40B.

At the front-end processing area 24, the hardware accelerator 20 may be further configured to multiply the first submatrix 42A by the second submatrix 42B to compute the first intermediate partial matrix 44A of the plurality of intermediate partial matrices 44. The first intermediate partial matrix 44A may be computed in a first iteration of the plurality of iterations. The hardware accelerator 20 may be further configured to transmit the first intermediate partial matrix 44A to the back-end processing area 26.

In each of one or more subsequent iterations of the plurality of iterations, the hardware accelerator 20 may be further configured to read an additional submatrix 42C into the front-end processing area 24. The additional submatrix 42C may be included in the first matrix 40A or the second matrix 40B and may be read into the front-end processing area 24 from the first input buffer 22A or the second input buffer 22B. At the front-end processing area 24, the hardware accelerator 20 may be further configured to compute an additional intermediate partial matrix 44B as a product of the additional submatrix 42C and a submatrix reused from an immediately prior iteration of the plurality of iterations. The reused submatrix may be the first submatrix 42A or the second submatrix 42B in the example of FIG. 3. In iterations after a second iteration, the reused submatrix may be an additional submatrix 42C that was read into the front-end processing area 24 during a previous iteration. When the product of the reused submatrix and the additional submatrix 42C is computed, the intermediate partial matrix 44 computed as the result of the multiplication may be transmitted to the back-end processing area 26. The intermediate partial matrices 44 may be summed at the back-end processing area 26 to determine the partial matrices 46, as discussed in further detail below.

Figure 4A:
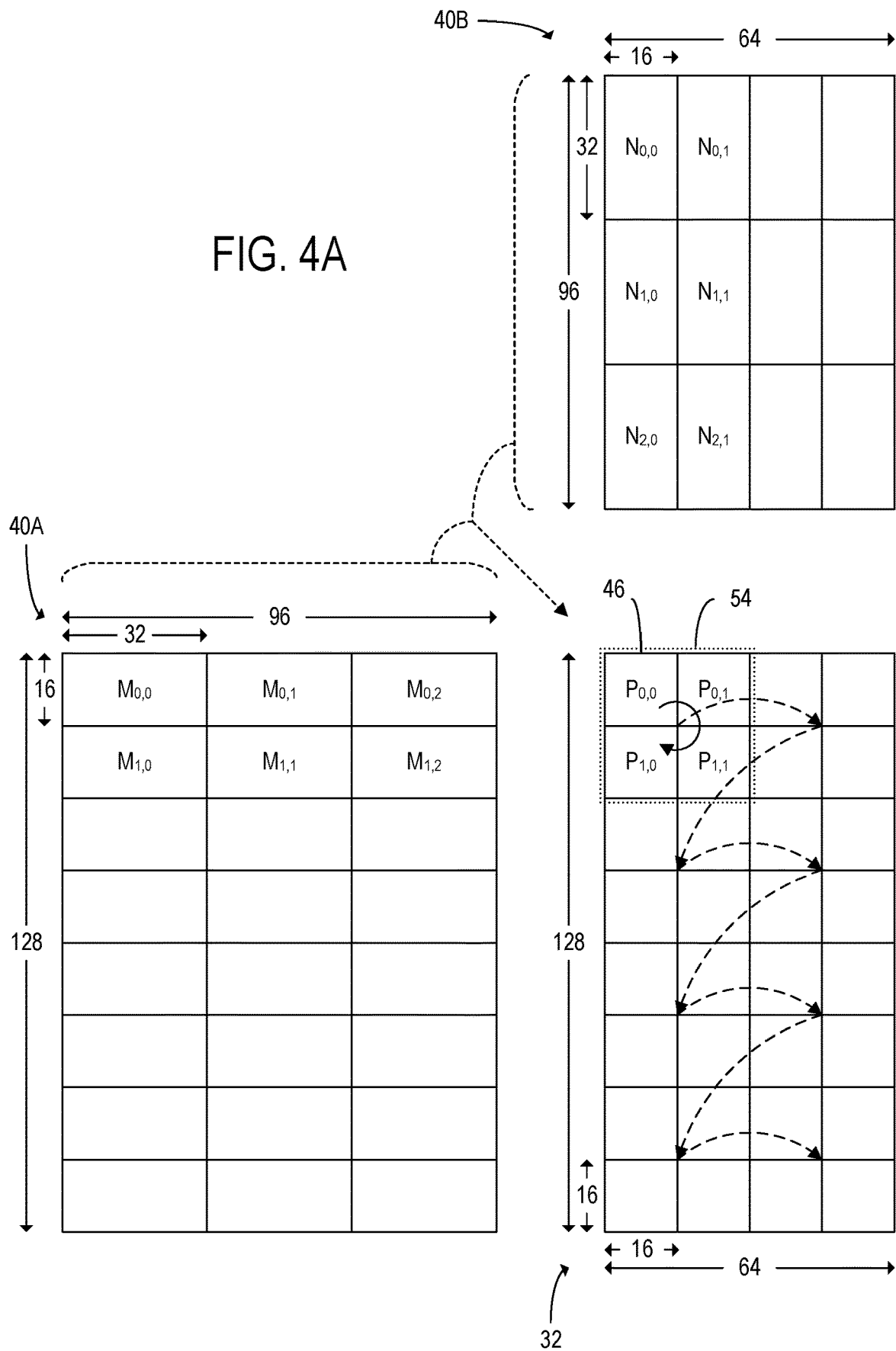
FIG. 4A schematically shows an example of a first matrix, a second matrix, and an output matrix computed as a product of the first matrix and the second matrix, according to the example of FIG. 1.

The hardware accelerator 20 may be configured to iteratively compute the plurality of intermediate partial matrices 44 for a plurality of partial matrix regions 54, as shown in the example of FIG. 4A. Within each partial matrix region 54, a plurality of partial matrices 46 may be computed as the sum of intermediate partial matrices 44. Each partial matrix region 54 may include a rectangular grid of partial matrices 46. For example, each partial matrix region 54 shown in FIG. 4A includes four partial matrices 46 arranged in a square. In addition, the plurality of partial matrix regions 54 are each of a same size in the example of FIG. 4A. It is appreciated that the arrangement of partial matrices 46 depicted in FIG. 4A is only one example, and that the plurality of partial matrices 46 may be arranged into a plurality of partial matrix regions 54 differently in other examples.

As shown in FIG. 4A, each partial matrix 46 and each intermediate partial matrix 44 may be a square matrix. In such examples, the first submatrix 42A may be a k×r matrix, where k and r are integers. In addition, the second submatrix 42B may be an r×k matrix. As shown in the example of FIG. 4A, k is equal to 16. However, in other examples, other values of k such as 32 or 64 may be used. Each additional submatrix 42C that is read into the front-end processing area 24 subsequently to the first iteration may also be a k×r matrix or an r×k matrix and may match the dimensions of the submatrix it replaces in the front-end processing area 24. Thus, in such examples, each partial matrix 46 may be a k×k matrix. In the example of FIG. 4A, the first matrix 40A has dimensions 128×96 and the second matrix 40B has dimensions 96×64. Thus, the output matrix 32 has dimensions 128×64 in the example of FIG. 4A. In addition, each submatrix of the first matrix 40A has dimensions 16×32 and each submatrix of the second matrix 40B has dimensions 32×16. Each partial matrix 46 and each intermediate partial matrix 44 therefore has dimensions 16×16.

Figure 4B:
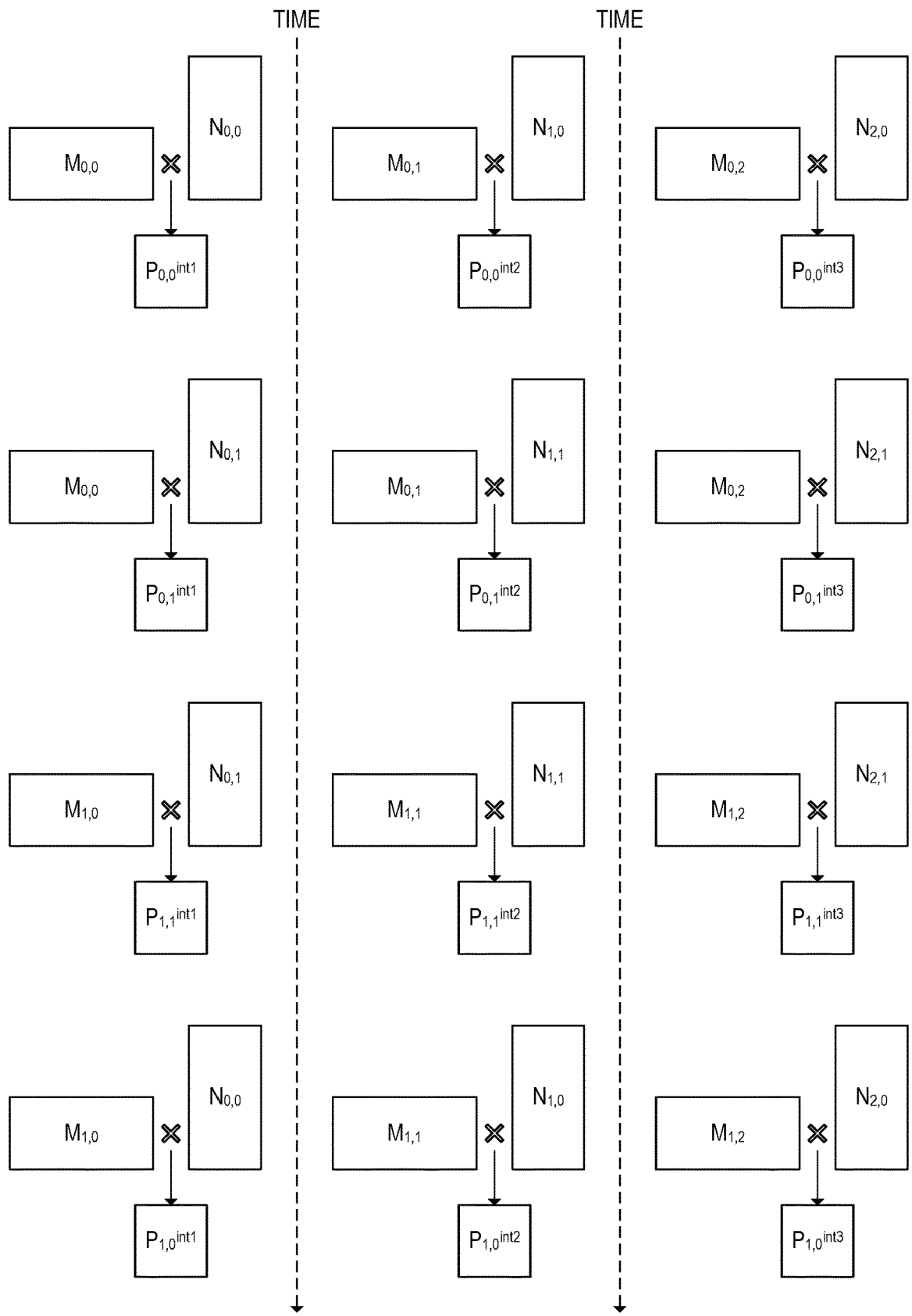
FIG. 4B schematically shows the computation of a plurality of intermediate partial matrices by multiplying submatrices of the first matrix and the second matrix, according to the example of FIG. 4A.

When hardware accelerator 20 computes the plurality of intermediate partial matrices 44 at the front-end processing area 24, the hardware accelerator 20 may be configured to cycle through locations in the partial matrix region 54 in a counterclockwise direction, as shown in the example of FIG. 4A. FIG. 4B shows the order in which the front-end processing area 24 computes the plurality of intermediate partial matrices 44 in the example of FIG. 4A. By cycling through the locations in the partial matrix region 54, the front-end processing area 24 may reuse the first submatrix $M_{0,0}$ from the computation of the intermediate partial matrix $P_{0,0}^{int1}$ when computing the intermediate partial matrix $P_{0,1}^{int1}$. Similarly, the submatrix $N_{0,1}$ may be reused from the computation of $P_{0,1}^{int1}$ when computing $P_{1,1}^{int1}$, and the submatrix $M_{1,0}$ may be reused from the computation of $P_{1,1}^{int1}$ when computing $P_{1,0}^{int1}$. Although FIGS. 4A and 4B show the intermediate partial matrices 44 being computed in a counterclockwise cycle, the hardware accelerator 20 may alternatively be configured to cycle through the locations in the partial matrix region in a clockwise direction. Additionally or alternatively, the hardware accelerator 20 may be configured to start at a location in the partial matrix region 54 other than the location of the partial matrix $P_{0,0}$.

The hardware accelerator 20 may, in the example of FIGS. 4A and 4B, be configured to compute the plurality of intermediate partial matrices 44 in three cycles through the partial matrix region 54. In each of those cycles, the hardware accelerator 20 may be configured to compute an intermediate partial matrix 44 for each of the four partial matrix locations. As depicted in FIG. 4B, the hardware accelerator 20 may be configured to compute the intermediate partial matrices $P_{0,0}^{int1}$, $P_{0,1}^{int1}$, $P_{1,1}^{int1}$, and $P_{1,0}^{int1}$ in the first cycle, the intermediate partial matrices $P_{0,0}^{int2}$, $P_{0,1}^{int2}$, $P_{1,1}^{int2}$, and $P_{1,0}^{int2}$ in the second cycle, and the intermediate partial matrices $P_{0,0}^{int3}$, $P_{0,1}^{int3}$, $P_{1,1}^{int3}$, and $P_{1,0}^{int3}$ in the third cycle. The intermediate partial matrices 44 computed in each cycle may be computed sequentially or in parallel.

Figure 4C:
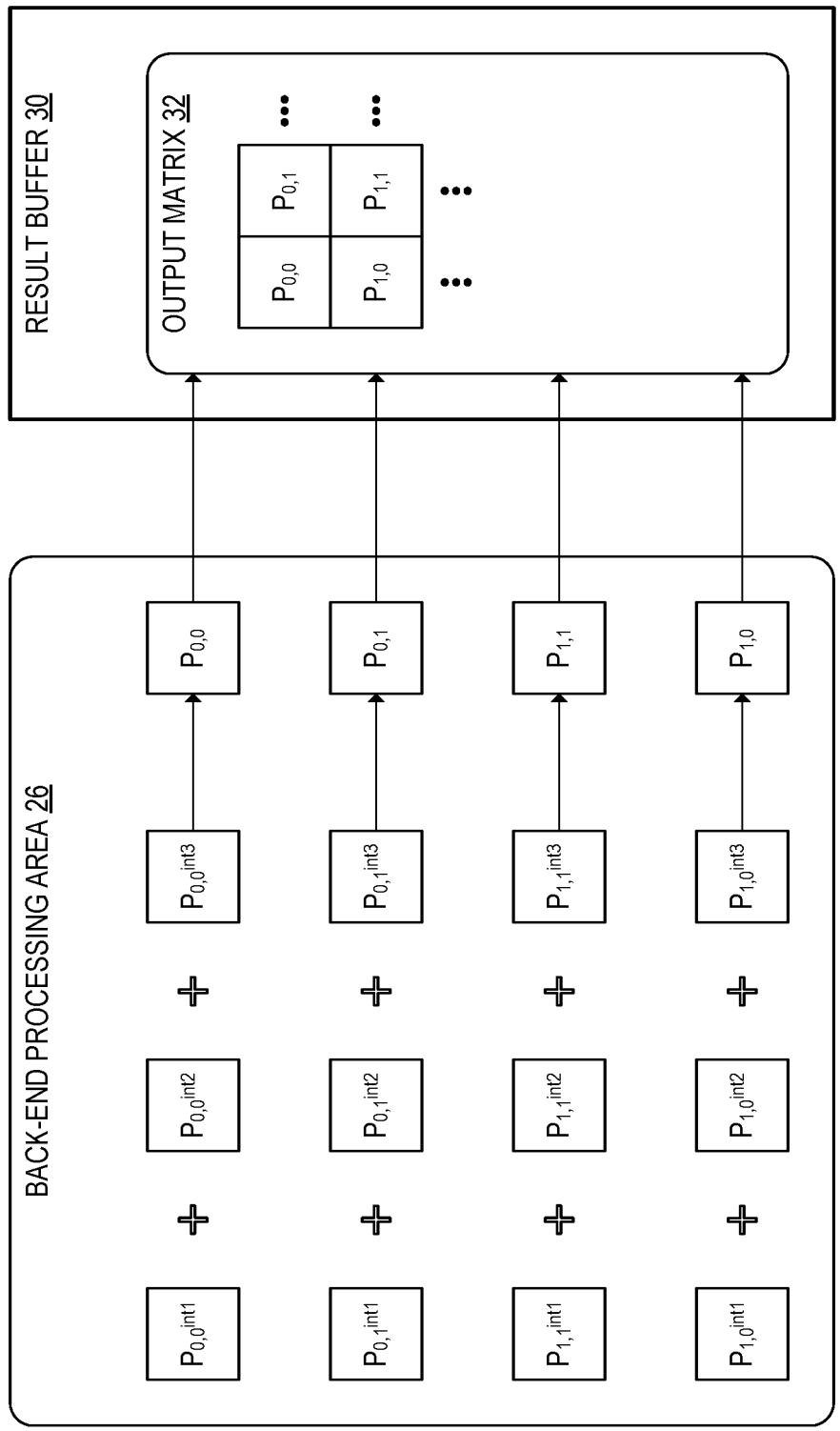
FIG. 4C schematically shows a back-end processing area of the hardware accelerator when the plurality of intermediate partial matrices are added to determine a plurality of partial matrices, according to the example of FIG. 4B.

FIG. 4C schematically shows the back-end processing area 26 of the hardware accelerator 20 in the example of FIGS. 4A and 4B. At the back-end processing area 26, the hardware accelerator 20 may be further configured to compute each partial matrix 46 of the plurality of partial matrices 46 as a sum of two or more of the intermediate partial matrices 44 that correspond to a shared position within the partial matrix region 54. The hardware accelerator 20 may be further configured to output the plurality of partial matrices 46 to the result buffer 30. In some examples, the plurality of partial matrices 46 may be read into the result buffer 30 in the form of an output matrix 32 in which the plurality of partial matrices 46 are assembled into the full product of the first matrix 40A and the second matrix 40B. Alternatively, the partial matrices 46 may be read into the result buffer 30 in smaller increments.

After the front-end processing area 24 computes the partial matrices 46 for a partial matrix region 54, the hardware accelerator 20 may be further configured to compute the partial matrices 46 for another partial matrix region 54. In the example of FIG. 4A, the hardware accelerator 20 is configured to compute the plurality of partial matrices 46 two rows of submatrices at a time, moving from left to right. However, the hardware accelerator 20 may alternatively be configured to compute the partial matrices 46 for the partial matrix regions 54 in some other ordering of the partial matrix regions 54. For example, the hardware accelerator 20 may be configured to compute the plurality of partial matrices 46 two rows of submatrices at a time and alternate between a left-to-right direction and a right-to-left direction, forming a snaking pattern.

Figure 5:
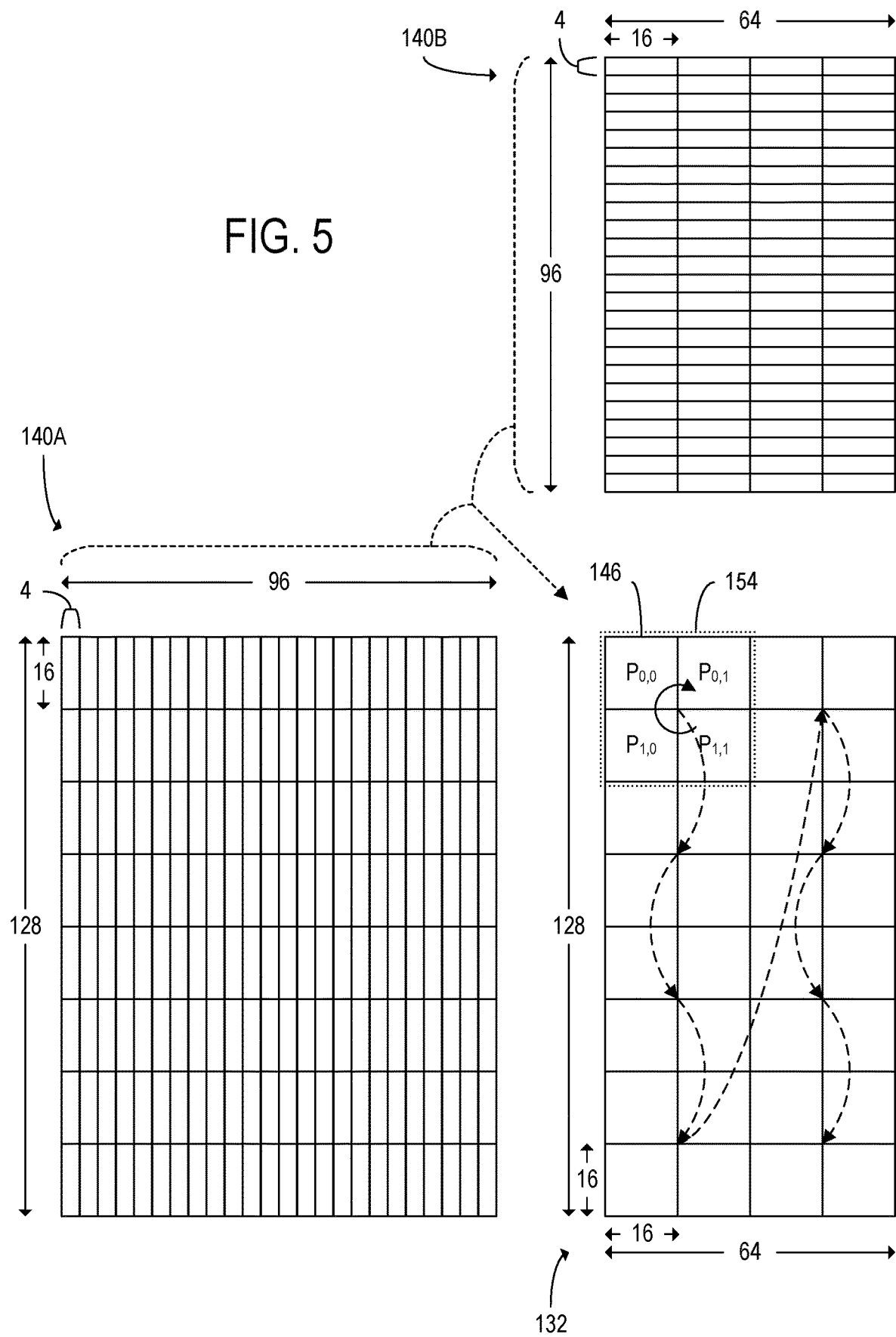
FIG. 5 schematically shows another example of a first matrix, a second matrix, and an output matrix computed as a product of the first matrix and the second matrix, according to the example of FIG. 1.

FIG. 5 shows an example multiplication of a first matrix 140A by a second matrix 140B at the hardware accelerator 20. As in the example of FIG. 4A, the first matrix 140A shown in FIG. 5 has dimensions 128×96 and the second matrix 140B has dimensions 96×64. In the example of FIG. 5, each submatrix of the first matrix 140A has dimensions 16×4 and each submatrix of the second matrix 140B has dimensions 4×16. Thus, each partial matrix 146 has dimensions 16×16. Each partial matrix region 154 in the example of FIG. 5 includes four partial matrices 146 arranged in a square. The hardware accelerator 20 may be configured to compute the plurality of partial matrices 146 of the partial matrix regions 154 two columns of submatrices at a time, moving in a top-to-bottom direction.

Figure 6:
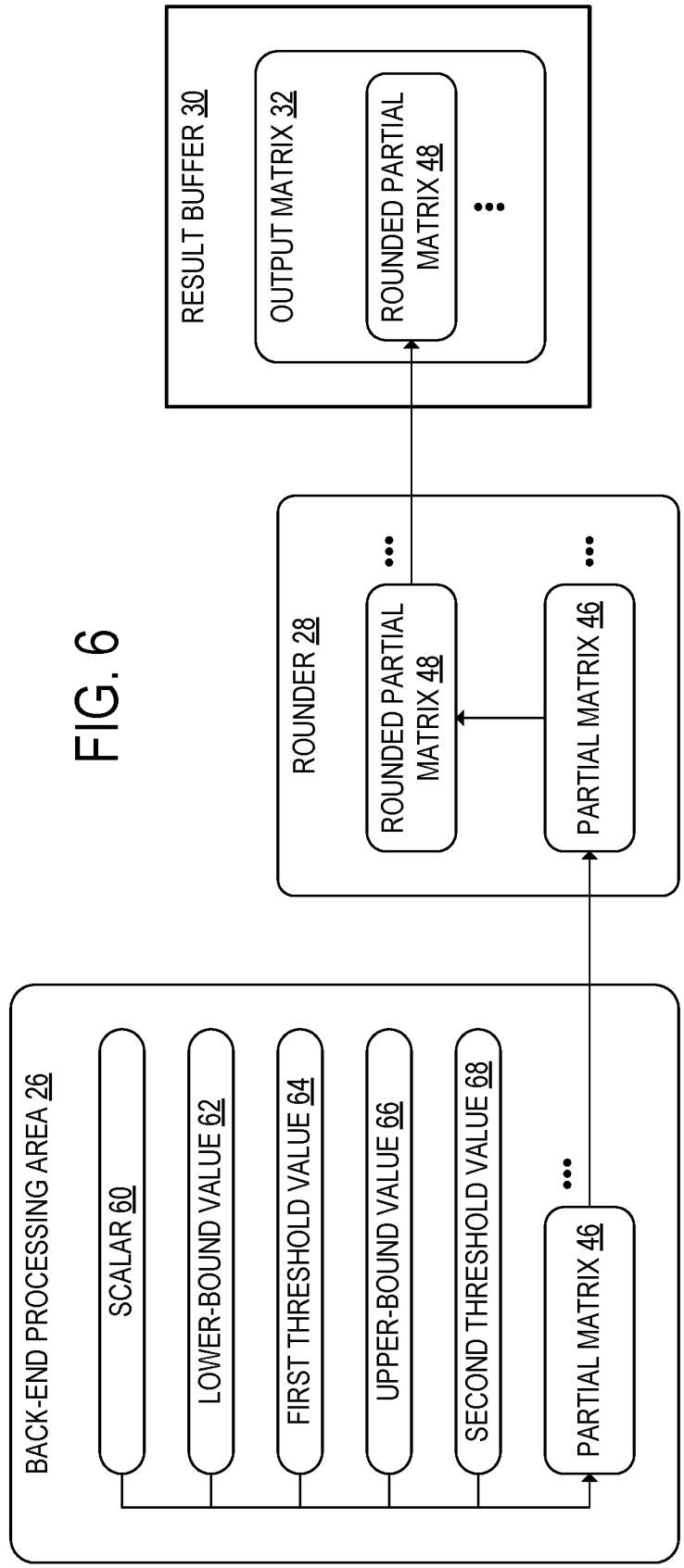
FIG. 6 schematically shows the back-end processing area and a rounder included in the hardware accelerator when an output matrix is computed from the plurality of partial matrices, according to the example of FIG. 1.

The hardware accelerator 20 may be further configured to perform one or more additional operations on the partial matrix elements of the plurality of partial matrices 46 prior to transmitting the partial matrices 46 to the result buffer 30. FIG. 6 shows the back-end processing area 26, the rounder 28, and the result buffer 30 in an example in which such additional operations are performed. For example, at the back-end processing area 26, the hardware accelerator 20 may be further configured to add a scalar 60 to each partial matrix element included in the plurality of partial matrices 46.

Additionally or alternatively, at the back-end processing area 26, the hardware accelerator 20 may be further configured to set at least one partial matrix element to a lower-bound value 62 when the at least one partial matrix element is below a first threshold value 64 or set the at least one partial matrix element to an upper-bound value 66 when the at least one partial matrix element is above a second threshold value 68. For example, the lower-bound value 62 may be equal to the first threshold value 64 and the upper bound value 66 may be equal to the second threshold value 68. Thus, the hardware accelerator 20 may impose a minimum and/or a maximum on the partial matrix elements. The lower-bound value 62 and the first threshold value 64 may, for example, be used when the hardware accelerator 20 computes a rectified linear unit (ReLU) activation function when generating a machine learning model. In other examples, the lower-bound value 62 may differ from the first threshold value 64, or the upper bound value 66 may differ from the second threshold value 68.

In some examples, the hardware accelerator 20 may be further configured to convey the plurality of partial matrices 46 from the back-end processing area 26 to a rounder 28, as discussed above. At the rounder 28, the hardware accelerator 20 may be further configured to round one or more partial matrix elements included in the plurality of partial matrices 46. For example, the rounding scheme used by the rounder 28 may be round-to-nearest-even, round-to-zero, or truncate. The hardware accelerator 20 may be configured to generate a rounded partial matrix 48, which may be transmitted to the result buffer 30 for inclusion in the output matrix 32.

Figure 7:
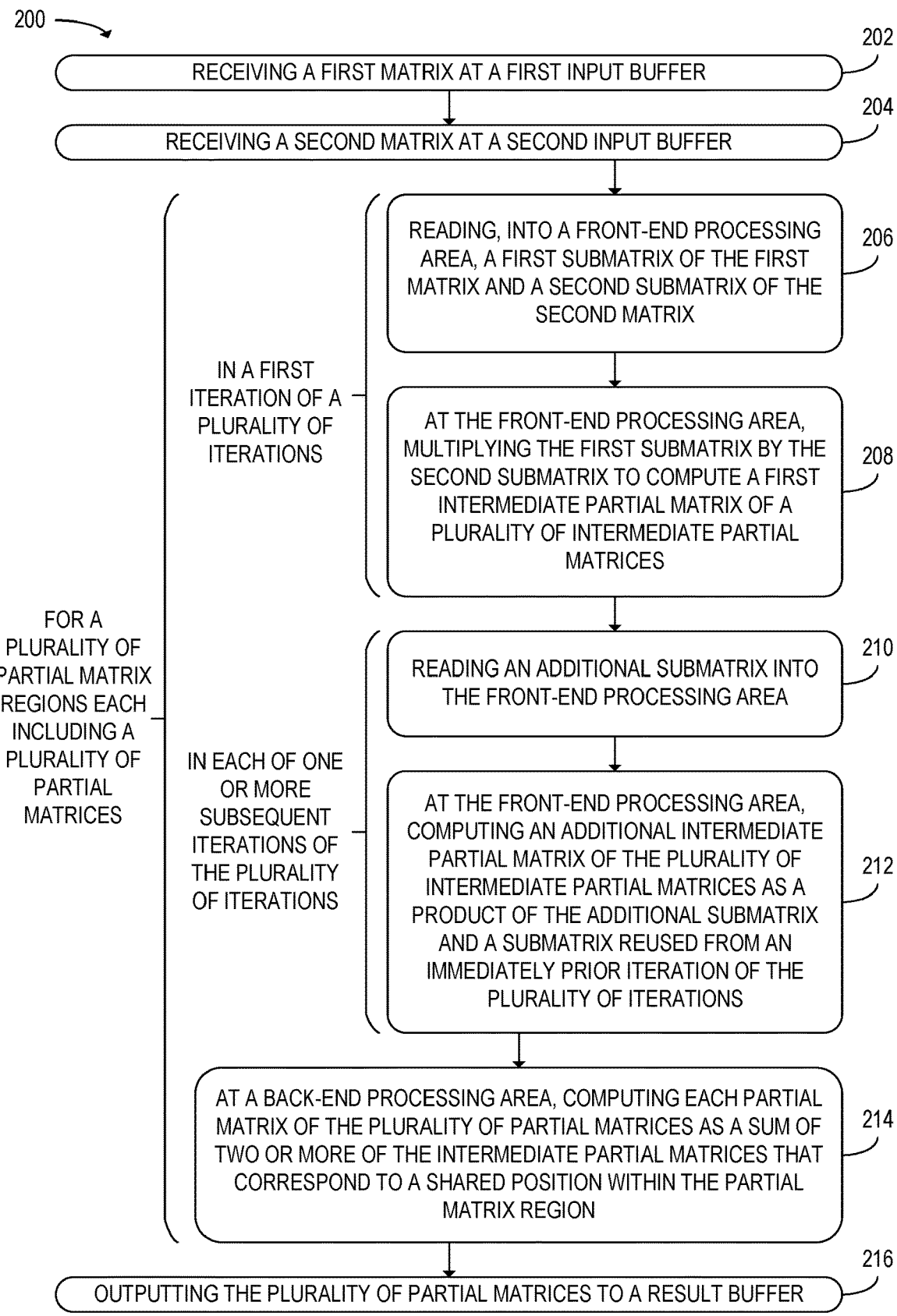
FIG. 7 shows a flowchart of a method for use with a computing device that includes a hardware accelerator, according to the example of FIG. 1.

FIG. 7 shows a flowchart of an example method 200 for use with a computing device, which may be the computing device 10 of FIG. 1. The steps of the method 200 may each be performed at a hardware accelerator included in the computing device. At step 202, the method 200 may include receiving a first matrix at a first input buffer. In addition, at step 204, the method 200 may further include receiving a second matrix at a second input buffer. The first matrix and the second matrix may, in some examples, be segments of larger matrices that are segmented for processing at one or more hardware accelerators. In such examples, a plurality of first matrices and a plurality of second matrices in which the first matrix and the second matrix are respectively included may be multiplied in parallel at a respective plurality of hardware accelerators included in a hardware accelerator array.

Steps 206, 208, 210, 212, and 214 of the method 200 may be executed for a plurality of partial matrix regions each including a plurality of partial matrices. Each partial matrix region may be a rectangular grid of partial matrices. For example, the partial matrix region may be a square matrix including a plurality of elements of the product of the first matrix and the second matrix. The plurality of partial matrix regions may each be of a same size. In these steps, the plurality of partial matrices may be computed by first computing a plurality of intermediate partial matrices. Steps 206, 208, 210, 212, and 214 may be repeated for each partial matrix region included in the product of the first matrix and the second matrix.

Steps 206 and 208 may be performed in a first iteration of a plurality of iterations performed for a partial matrix region. At step 206, the method 200 may further include reading, into a front-end processing area, a first submatrix of the first matrix and a second submatrix of the second matrix. For example, the first submatrix may be a k×r matrix, where k and r are integers, and the second submatrix may be an r×k matrix. Thus, in this example, each partial matrix may be a k×k matrix. At the front-end processing area, the method 200 may further include, at step 208, multiplying the first submatrix by the second submatrix to compute a first intermediate partial matrix of a plurality of intermediate partial matrices.

Steps 210 and 212 may be performed in each of one or more subsequent iterations of the plurality of iterations performed for the partial matrix region. At step 210, the method 200 may further include reading an additional submatrix into the front-end processing area. The additional submatrix may replace the first submatrix or the second submatrix in the front-end processing area. At step 212, the method 200 may further include, at the front-end processing area, computing an additional intermediate partial matrix of the plurality of intermediate partial matrices. The additional intermediate partial matrix may be a product of the additional submatrix and a submatrix reused from an immediately prior iteration of the plurality of iterations. In the second iteration of the plurality of iterations, the first submatrix or the second submatrix may be reused. In iterations later than the second iteration, the reused submatrix may be the first submatrix, the second submatrix, or an additional submatrix that was read into the front-end processing area in an earlier iteration.

At step 214, the method 200 may further include, at a back-end processing area, computing each partial matrix of the plurality of partial matrices as a sum of two or more of the intermediate partial matrices that correspond to a shared position within the partial matrix region. In one example, each partial matrix region may include four partial matrices arranged in a square. In this example, for each partial matrix region of the plurality of partial matrix regions, the plurality of intermediate partial matrices may be computed in a clockwise or counterclockwise cycle through the four partial matrices. For each of the four quarters of the square, the intermediate partial matrices computed for that quarter may be summed to determine the partial matrix for that quarter. After the plurality of partial matrices included in the partial matrix region have been computed, the plurality of partial matrices in another partial matrix region may be computed. For example, the front-end processing area may compute the plurality of partial matrices in rows of partial matrix regions or in columns of partial matrix regions.

At step 216, the method 200 may further include outputting the plurality of partial matrices to a result buffer. The plurality of partial matrices may be output to the result buffer in the form of an output matrix that includes each of the partial matrices. Alternatively, the partial matrices may be output to the result buffer in smaller increments. For example, each partial matrix region may be output to the result buffer separately.

FIG. 8 shows additional processing steps of the method 200 that may be applied to the plurality of partial matrices at the hardware accelerator after the plurality of partial matrices have been computed at the front-end processing area and before the plurality of partial matrices are output to the result buffer. At step 218, the method 200 may further include, at the back-end processing area, adding a scalar to each partial matrix element included in the plurality of partial matrices. Additionally or alternatively, the method 200 may further include, at step 220, setting at least one partial matrix element to a lower-bound value when the at least one partial matrix element is below a first threshold value. The at least one partial matrix element may be set to the lower-bound value at the back-end processing area. Alternatively, at step 222, the method 200 may further include setting the at least one partial matrix element to an upper-bound value when the at least one partial matrix element is above a second threshold value. In some examples, one or more partial matrix elements may be set to the lower-bound value and one or more partial matrix elements may be set to the upper bound value. At step 224, the method 200 may further include rounding one or more partial matrix elements included in the plurality of partial matrices. The one or more partial matrix elements may be rounded at the back-end processing area or a rounder provided in the hardware accelerator separately from the back-end processing area.

Using the devices and method discussed above, matrix multiplication operations may be performed at the hardware accelerator more quickly and with reduced memory and bandwidth usage in comparison to performing matrix multiplication at a general-purpose processor. Thus, when training machine learning models or performing other computing tasks in which large amount of matrix multiplication are performed, large savings in time and computing resources may be achieved using the devices and methods discussed above.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
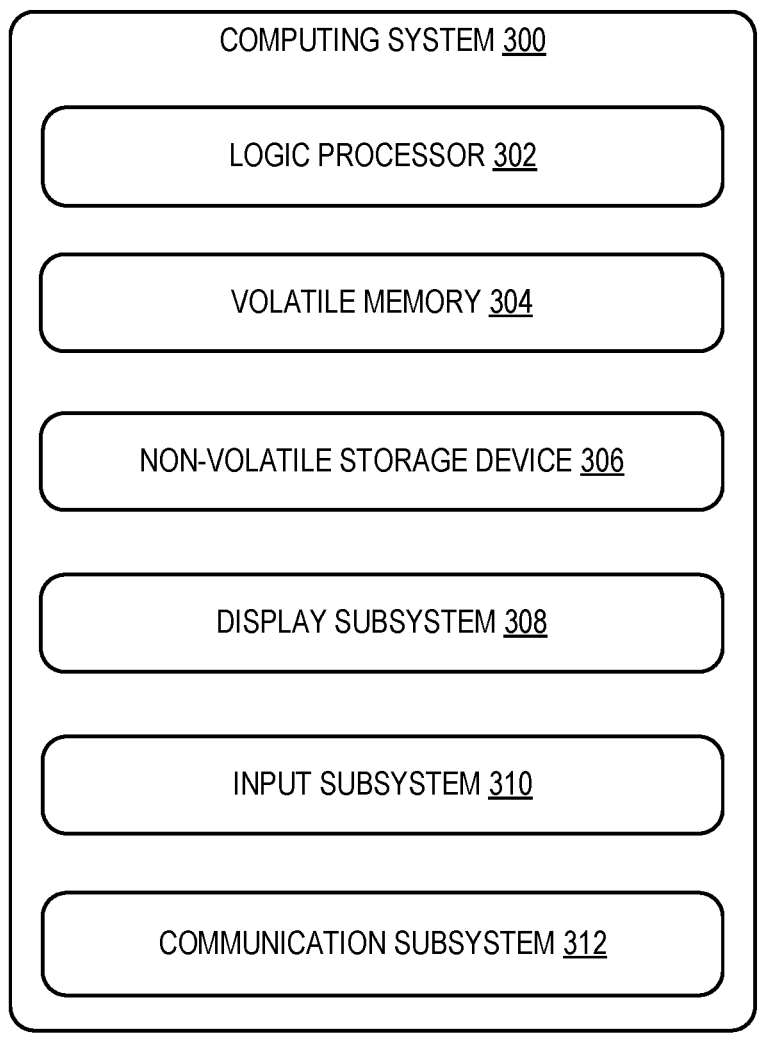
FIG. 9 shows a schematic view of an example computing environment in which the computing device of FIG. 1 may be enacted.

FIG. 9 schematically shows a non-limiting embodiment of a computing system 300 that can enact one or more of the methods and processes described above. Computing system 300 is shown in simplified form. Computing system 300 may embody the computing device 10 described above and illustrated in FIG. 1. Components of the computing system 300 may be instantiated in one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 9.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

The following paragraphs discuss several aspects of the present disclosure. According to one aspect of the present disclosure, a computing device is provided, including a hardware accelerator configured to receive a first matrix at a first input buffer and receive a second matrix at a second input buffer. For a plurality of partial matrix regions each including a plurality of partial matrices, in a first iteration of a plurality of iterations, the hardware accelerator may be further configured to read, into a front-end processing area, a first submatrix of the first matrix and a second submatrix of the second matrix. At the front-end processing area, the hardware accelerator may be further configured to multiply the first submatrix by the second submatrix to compute a first intermediate partial matrix of a plurality of intermediate partial matrices. In each of one or more subsequent iterations of the plurality of iterations, the hardware accelerator may be further configured to read an additional submatrix into the front-end processing area. At the front-end processing area, the hardware accelerator may be further configured to compute an additional intermediate partial matrix of the plurality of intermediate partial matrices as a product of the additional submatrix and a submatrix reused from an immediately prior iteration of the plurality of iterations. At a back-end processing area, the hardware accelerator may be further configured to compute each partial matrix of the plurality of partial matrices as a sum of two or more of the intermediate partial matrices that correspond to a shared position within the partial matrix region. The hardware accelerator may be further configured to output the plurality of partial matrices to a result buffer.

According to this aspect, each partial matrix may be a square matrix.

According to this aspect, the first submatrix may be a k×r matrix, where k and r are integers. The second submatrix is an r×k matrix, and each partial matrix may be a k×k matrix.

According to this aspect, each partial matrix region may include a rectangular grid of partial matrices.

According to this aspect, for each partial matrix region of the plurality of partial matrix regions, the hardware accelerator may be configured to compute the plurality of intermediate partial matrices in a clockwise or counterclockwise cycle.

According to this aspect, the plurality of partial matrix regions may each be of a same size.

According to this aspect, the hardware accelerator may be further configured to round one or more partial matrix elements included in the plurality of partial matrices.

According to this aspect, the hardware accelerator may be configured to, at the back-end processing area, add a scalar to each partial matrix element included in the plurality of partial matrices.

According to this aspect, the hardware accelerator may be configured to, at the back-end processing area, set at least one partial matrix element to a lower-bound value when the at least one partial matrix element is below a first threshold value or set the at least one partial matrix element to an upper-bound value when the at least one partial matrix element is above a second threshold value.

According to this aspect, a plurality of first matrices and a plurality of second matrices in which the first matrix and the second matrix are respectively included may be multiplied in parallel at a respective plurality of hardware accelerators included in a hardware accelerator array.

According to another aspect of the present disclosure, a method for use with a computing device is provided. The method may include, at a hardware accelerator, receiving a first matrix at a first input buffer and receiving a second matrix at a second input buffer. For a plurality of partial matrix regions each including a plurality of partial matrices, in a first iteration of a plurality of iterations, the method may further include reading, into a front-end processing area, a first submatrix of the first matrix and a second submatrix of the second matrix. At the front-end processing area, the method may further include multiplying the first submatrix by the second submatrix to compute a first intermediate partial matrix of a plurality of intermediate partial matrices. In each of one or more subsequent iterations of the plurality of iterations, the method may further include reading an additional submatrix into the front-end processing area. At the front-end processing area, the method may further include computing an additional intermediate partial matrix of the plurality of intermediate partial matrices as a product of the additional submatrix and a submatrix reused from an immediately prior iteration of the plurality of iterations. At a back-end processing area, the method may further include computing each partial matrix of the plurality of partial matrices as a sum of two or more of the intermediate partial matrices that correspond to a shared position within the partial matrix region. The method may further include outputting the plurality of partial matrices to a result buffer.

According to this aspect, each partial matrix may be a square matrix.

According to this aspect, the first submatrix may be a k×r matrix, where k and r are integers. The second submatrix may be an r×k matrix, and each partial matrix may be a k×k matrix.

According to this aspect, each partial matrix region may include a rectangular grid of partial matrices.

According to this aspect, the plurality of partial matrix regions may each be of a same size.

According to this aspect, the method may further include, at the hardware accelerator, rounding one or more partial matrix elements included in the plurality of partial matrices.

According to this aspect, the method may further include, at the back-end processing area, adding a scalar to each partial matrix element included in the plurality of partial matrices.

According to this aspect, the method may further include, at the back-end processing area, setting at least one partial matrix element to a lower-bound value when the at least one partial matrix element is below a first threshold value or setting the at least one partial matrix element to an upper-bound value when the at least one partial matrix element is above a second threshold value.

According to this aspect, a plurality of first matrices and a plurality of second matrices in which the first matrix and the second matrix are respectively included may be multiplied in parallel at a respective plurality of hardware accelerators included in a hardware accelerator array.

According to another aspect of the present disclosure, a computing device is provided, including a hardware accelerator configured to receive a first matrix at a first input buffer and receive a second matrix at a second input buffer. For a plurality of partial matrix regions each including a plurality of partial matrices, the hardware accelerator may be further configured to compute the plurality of partial matrices at least in part by, in a first iteration of a plurality of iterations, multiplying a first submatrix including a plurality of first matrix elements of the first matrix by a second submatrix including a plurality of second matrix elements of the second matrix to compute a first intermediate partial matrix of a plurality of intermediate partial matrices. In each of one or more subsequent iterations of the plurality of iterations, computing the plurality of partial matrices may further include computing an additional intermediate partial matrix of the plurality of intermediate partial matrices as a product of an additional submatrix and a submatrix reused from an immediately prior iteration of the plurality of iterations. Computing the plurality of partial matrices may further include computing each partial matrix of the plurality of partial matrices as a sum of two or more of the intermediate partial matrices that correspond to a shared position within the partial matrix region. Computing the plurality of partial matrices may further include outputting an output matrix including the plurality of partial matrices to a result buffer.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a hardware accelerator including an on-chip controller configured to control the hardware accelerator to:
receive a first matrix at a first input buffer;
receive a second matrix at a second input buffer;
for a plurality of partial matrix regions each including a plurality of partial matrices:
in a first iteration of a plurality of iterations:
read, into a front-end processing area included in the hardware accelerator and operatively coupled to the first input buffer and the second input buffer, a first submatrix of the first matrix and a second submatrix of the second matrix; and
at the front-end processing area, multiply the first submatrix by the second submatrix to compute a first intermediate partial matrix of a plurality of intermediate partial matrices;
in each of one or more subsequent iterations of the plurality of iterations:
read an additional submatrix into the front-end processing area; and
at the front-end processing area, compute an additional intermediate partial matrix of the plurality of intermediate partial matrices as a product of the additional submatrix and a submatrix reused from an immediately prior iteration of the plurality of iterations, wherein the hardware accelerator is configured to alternate between reusing respective submatrices of the first matrix and the second matrix;
at a back-end processing area included in the hardware accelerator and operatively coupled to the front-end processing area, compute each partial matrix of the plurality of partial matrices as a sum of two or more of the intermediate partial matrices that correspond to a shared position within the partial matrix region; and
output the plurality of partial matrices to one or more other components of the computing device via a result buffer.

2. The computing device of claim 1, wherein each partial matrix is a square matrix.

3. The computing device of claim 2, wherein:
the first submatrix is a $k \times r$ matrix, where k and r are integers;
the second submatrix is an $r \times k$ matrix; and
each partial matrix is a $k \times k$ matrix.

4. The computing device of claim 1, wherein each partial matrix region includes a rectangular grid of partial matrices.

5. The computing device of claim 4, wherein, for each partial matrix region of the plurality of partial matrix regions, the hardware accelerator is configured to compute the plurality of intermediate partial matrices in a clockwise or counterclockwise cycle.

6. The computing device of claim 1, wherein the plurality of partial matrix regions are each of a same size.

7. The computing device of claim 1, wherein the hardware accelerator is further configured to round one or more partial matrix elements included in the plurality of partial matrices.

8. The computing device of claim 1, wherein the hardware accelerator is configured to, at the back-end processing area, add a scalar to each partial matrix element included in the plurality of partial matrices.

9. The computing device of claim 1, wherein the hardware accelerator is configured to, at the back-end processing area:
set at least one partial matrix element to a lower-bound value when the at least one partial matrix element is below a first threshold value; or
set the at least one partial matrix element to an upper-bound value when the at least one partial matrix element is above a second threshold value.

10. The computing device of claim 1, wherein a plurality of first matrices and a plurality of second matrices in which the first matrix and the second matrix are respectively included are multiplied in parallel at a respective plurality of hardware accelerators included in a hardware accelerator array.

11. A method for use with a computing device, the method comprising:
at an on-chip controller included in a hardware accelerator, controlling the hardware accelerator to:
receiving a first matrix at a first input buffer;
receiving a second matrix at a second input buffer;

for a plurality of partial matrix regions each including a plurality of partial matrices:
  in a first iteration of a plurality of iterations:
    reading, into a front-end processing area included in the hardware accelerator and operatively coupled to the first input buffer and the second input buffer, a first submatrix of the first matrix and a second submatrix of the second matrix; and
    at the front-end processing area, multiplying the first submatrix by the second submatrix to compute a first intermediate partial matrix of a plurality of intermediate partial matrices;
  in each of one or more subsequent iterations of the plurality of iterations:
    reading an additional submatrix into the front-end processing area; and
    at the front-end processing area, computing an additional intermediate partial matrix of the plurality of intermediate partial matrices as a product of the additional submatrix and a submatrix reused from an immediately prior iteration of the plurality of iterations, wherein the hardware accelerator alternates between reusing respective submatrices of the first matrix and the second matrix;
  at a back-end processing area included in the hardware accelerator and operatively coupled to the front-end processing area, computing each partial matrix of the plurality of partial matrices as a sum of two or more of the intermediate partial matrices that correspond to a shared position within the partial matrix region; and
  outputting the plurality of partial matrices to one or more other components of the computing device via a result buffer.

12. The method of claim 11, wherein each partial matrix is a square matrix.

13. The method of claim 12, wherein:
  the first submatrix is a k×r matrix, where k and r are integers;
  the second submatrix is an r×k matrix; and
  each partial matrix is a k×k matrix.

14. The method of claim 11, wherein each partial matrix region includes a rectangular grid of partial matrices.

15. The method of claim 11, wherein the plurality of partial matrix regions are each of a same size.

16. The method of claim 11, further comprising, at the hardware accelerator, rounding one or more partial matrix elements included in the plurality of partial matrices.

17. The method of claim 11, further comprising, at the back-end processing area, adding a scalar to each partial matrix element included in the plurality of partial matrices.

18. The method of claim 11, further comprising, at the back-end processing area:
  setting at least one partial matrix element to a lower-bound value when the at least one partial matrix element is below a first threshold value; or
  setting the at least one partial matrix element to an upper-bound value when the at least one partial matrix element is above a second threshold value.

19. The method of claim 11, wherein a plurality of first matrices and a plurality of second matrices in which the first matrix and the second matrix are respectively included are multiplied in parallel at a respective plurality of hardware accelerators included in a hardware accelerator array.

20. A computing device comprising:
  a hardware accelerator including an on-chip controller configured to control the hardware accelerator to:
    receive a first matrix at a first input buffer;
    receive a second matrix at a second input buffer;
    for a plurality of partial matrix regions each including a plurality of partial matrices, compute the plurality of partial matrices at least in part by:
      in a first iteration of a plurality of iterations, at a front-end processing area included in the hardware accelerator and operatively coupled to the first input buffer and the second input buffer, multiplying a first submatrix including a plurality of first matrix elements of the first matrix by a second submatrix including a plurality of second matrix elements of the second matrix to compute a first intermediate partial matrix of a plurality of intermediate partial matrices;
      in each of one or more subsequent iterations of the plurality of iterations, computing an additional intermediate partial matrix of the plurality of intermediate partial matrices as a product of an additional submatrix and a submatrix reused from an immediately prior iteration of the plurality of iterations, wherein the hardware accelerator is configured to alternate between reusing respective submatrices of the first matrix and the second matrix;
    at a back-end processing area included in the hardware accelerator and operatively coupled to the front-end processing area, computing each partial matrix of the plurality of partial matrices as a sum of two or more of the intermediate partial matrices that correspond to a shared position within the partial matrix region; and
    outputting an output matrix including the plurality of partial matrices to one or more other components of the computing device via a result buffer.

* * * * *